(12) United States Patent
Nun et al.

(10) Patent No.: US 7,968,202 B2
(45) Date of Patent: Jun. 28, 2011

(54) METHOD FOR SEALING NATURAL STONES

(75) Inventors: Edwin Nun, Billerbeck (DE); Volker Hennige, Duelmen (DE); Uwe Paulmann, Luedinghusen (DE); Hannelore Armoneit, Recklinghausen (DE); Sigrid Banken, Dorsten (DE); Marie-Theres Wilkes, Dorsten (DE); Norbert Kern, Haltern (DE); Christian Herkt-Bruns, Muenster (DE); Thomas Schrief, Haltern am See (DE); Eckart Berendes, Marl (DE)

(73) Assignee: Evonik Degussa GmbH, Essen (DE)

( * ) Notice: Subject to any disclaimer, the term of this patent is extended or adjusted under 35 U.S.C. 154(b) by 1149 days.

(21) Appl. No.: 11/572,548

(22) PCT Filed: Jun. 1, 2005

(86) PCT No.: PCT/EP2005/052507
§ 371 (c)(1),
(2), (4) Date: Jan. 23, 2007

(87) PCT Pub. No.: WO2006/010663
PCT Pub. Date: Feb. 2, 2006

(65) Prior Publication Data
US 2007/0254178 A1   Nov. 1, 2007

(30) Foreign Application Priority Data
Jul. 24, 2004 (DE) .................. 10 2004 036 073

(51) Int. Cl.
B32B 9/04 (2006.01)

(52) U.S. Cl. .......... 428/446; 428/447; 524/588; 528/39

(58) Field of Classification Search .............. 428/446, 428/447; 524/588; 528/39
See application file for complete search history.

(56) References Cited

U.S. PATENT DOCUMENTS

| | | | |
|---|---|---|---|
| 2,803,561 A | 8/1957 | Kather | |
| 5,357,024 A * | 10/1994 | Leclaire | 528/39 |
| 6,096,173 A | 8/2000 | Von Hippel et al. | |
| 6,458,750 B1 | 10/2002 | Dardin et al. | |
| 6,620,514 B1 * | 9/2003 | Arpac et al. | 428/447 |
| 6,811,856 B2 | 11/2004 | Nun et al. | |
| 6,852,389 B2 | 2/2005 | Nun et al. | |
| 6,858,284 B2 | 2/2005 | Nun et al. | |
| 7,083,828 B2 | 8/2006 | Müller et al. | |
| 7,235,298 B2 | 6/2007 | Katusic et al. | |
| 7,288,501 B2 | 10/2007 | Auer et al. | |
| 7,374,743 B2 | 5/2008 | Katusic et al. | |
| 7,525,788 B2 | 4/2009 | Hoerpel et al. | |
| 2001/0036437 A1 | 11/2001 | Gutsch et al. | |
| 2001/0055639 A1 | 12/2001 | Moritz et al. | |
| 2003/0069350 A1 * | 4/2003 | Yoshihara et al. | 524/588 |
| 2003/0206854 A1 | 11/2003 | Gutsch et al. | |
| 2004/0028913 A1 | 2/2004 | Hennige et al. | |
| 2004/0154106 A1 | 8/2004 | Oles et al. | |
| 2005/0070193 A1 | 3/2005 | Hennige et al. | |
| 2005/0112326 A1 | 5/2005 | Nun et al. | |
| 2005/0118911 A1 | 6/2005 | Oles et al. | |
| 2005/0163951 A1 | 7/2005 | Oles et al. | |
| 2005/0167877 A1 | 8/2005 | Nun et al. | |
| 2005/0205830 A1 | 9/2005 | Oles et al. | |
| 2005/0208269 A1 | 9/2005 | Nun et al. | |
| 2005/0221192 A1 | 10/2005 | Hennige et al. | |
| 2005/0227045 A1 | 10/2005 | Oles et al. | |
| 2005/0253302 A1 | 11/2005 | Nun et al. | |
| 2006/0049376 A1 | 3/2006 | Nun et al. | |
| 2006/0128239 A1 | 6/2006 | Nun et al. | |
| 2006/0141223 A1 | 6/2006 | Oles et al. | |
| 2006/0156475 A1 | 7/2006 | Oles et al. | |
| 2006/0222815 A1 | 10/2006 | Oles et al. | |
| 2006/0235143 A1 | 10/2006 | Muller et al. | |
| 2007/0014970 A1 | 1/2007 | Nun et al. | |
| 2007/0175362 A1 | 8/2007 | Gutsch et al. | |
| 2007/0184993 A1 | 8/2007 | Scherer et al. | |
| 2007/0213237 A1 | 9/2007 | Scherer et al. | |
| 2007/0219101 A1 | 9/2007 | Scherer et al. | |
| 2008/0032197 A1 | 2/2008 | Horpel et al. | |
| 2008/0084686 A1 | 4/2008 | Gutsch et al. | |
| 2008/0138700 A1 | 6/2008 | Horpel et al. | |
| 2008/0206174 A1 | 8/2008 | Bergandt et al. | |
| 2008/0261032 A1 | 10/2008 | Nun et al. | |
| 2008/0280050 A1 | 11/2008 | Nun et al. | |
| 2008/0283171 A1 | 11/2008 | Nun et al. | |
| 2009/0078485 A1 | 3/2009 | Gutsch et al. | |
| 2010/0000079 A1 | 1/2010 | Horpel et al. | |
| 2010/0003401 A1 | 1/2010 | Horpel et al. | |

FOREIGN PATENT DOCUMENTS

| EP | 0 826 650 | 3/1998 |
|---|---|---|
| EP | 1 193 302 | 4/2003 |
| GB | 2137648 A * | 10/1984 |

OTHER PUBLICATIONS

U.S. Appl. No. 12/300,054, filed Nov. 7, 2008, Bergandt, et al.
U.S. Appl. No. 10/575,268, filed Apr. 11, 2006, Hennige, et al.
U.S. Appl. No. 10/588,952, filed Aug. 10, 2006, Nun, et al.
U.S. Appl. No. 60/021,600, filed Jan. 11, 2006, Riemenschneider, et al.
U.S. Appl. No. 08/842,775, filed Apr. 17, 1997, Riemenschneider, et al.
U.S. Appl. No. 09/441,439, filed Nov. 17, 1999, Barthold, et al.
U.S. Appl. No. 60/194,367, filed Apr. 4, 2002, Michael, et al.
U.S. Appl. No. 12/746,683, filed Jun. 7, 2010, Hedrich, et al.
U.S. Appl. No. 12/159,103, filed jun. 25, 2008, Nun, et al.
U.S. Appl. No. 12/037,431, filed Feb. 26, 2008, Bergandt, et al.

* cited by examiner

Primary Examiner — Leszek Kiliman
(74) Attorney, Agent, or Firm — Oblon, Spivak, McClelland, Maier & Neustadt, L.L.P.

(57) ABSTRACT

The present invention relates to a sealed natural cut stone, the pores of which are permeable to water vapor but are impermeable to aqueous liquids, and a method for the production thereof and the use of such natural cut stones.

10 Claims, No Drawings

METHOD FOR SEALING NATURAL STONES

The present invention relates to the sealing of natural stones, in particular the sealing of natural stones which are used as engineering material, so-called natural cut stones, and the sealed natural cut stones themselves.

Natural stone occupies an outstanding position among all building materials. Components of natural stone are therefore unique products in each case. There is scarcely a building material which has so many colors and structures as natural stone. Colors and structures of natural stones are enhanced by a variety of different surface processing operations, such as, for example, grinding or polishing.

Natural cut stone, i.e. natural stone which is used as building material, for facades, floors, coverings, steps, kitchen coverings, bath surrounds, windowsills, etc., is not a uniform industrial product but has its own history of origin. For example, dark inclusions in granite are an indication of the fusion of rock into the still liquid magma. Strata in sandstone are evidence of deposits of sediment in seas, river deltas and large reservoirs. Fossilizations in limestones give an account of long extinct eras, the folds of some gneisses give an account of intensive forces of movement in metamorphic processes and the cleavability of slate gives an account of powerful forces in the origin of mountain ranges.

The mechanical properties of natural stones are also convincing. It is not inferior to other building materials. Natural stone has strengths which are often superior to the strength of concrete. Structures from cultural history, for example Creek or Roman temples, the pyramids in Egypt or cathedrals and castles in Europe, bear witness to this even today after centuries or millennia. Natural stone makes it possible to introduce buildings with a high degree of independence into developed and undeveloped situations or to set new tones with the use of its wide range of colors and structures. Natural cut stone is a preferred material in the redesign of inner cities because it continues the tradition of the historical stock of buildings.

However, natural cut stones are being more and more widely used for the interior area too. Kitchen worktops made of granites are abrasion-resistant, stable to scouring, resistant to chemicals and substantially indestructible. This indestructibility is, however, only macroscopic. Microscopically, granite, like other stones too, contains pores such as, for example, micropores and/or mesopores. A colorant or odorous substance mobilized in a liquid or a dirt particle (food residues, such as, for example, milk) can penetrate through these pores and settle there. There is virtually no possibility, without destruction of the surfaces, of removing these colorants or odorous substances or the food residues again. The result of this is that the natural stone surfaces become discolored in an unattractive manner in the course of time and are no longer hygienic owing to decomposing food residues.

Marble rather than granite is used on vanity unit surrounds. Marble is substantially softer, more porous and as a rule lighter than granites. Marble is particularly sensitive to acidic media, such as, for example, citric acid or vinegar. Marble is also sensitive to mustard, ketchup or other organic media. The prolonged action of these media on the surface of the marble leads to contaminations which cannot be removed again.

A further problem area for the use of natural cut stones is the floor region. In the floor region, a complete seal, as, for example, on kitchen worktops or vanity units, is not desired but a certain breathing activity of the mineral floor coverings should be retained. It is very particularly the case with new buildings which have not yet been provided with inner coverings in a dry state, as was usual in the past. In the floor region, there are humidity differences in the course of the seasons so that the breathing activity is of outstanding importance. Nevertheless, it is also desired to protect such surfaces from dirt and damage, so that dirt, for example, cannot penetrate and cannot settle in an unremovable manner particularly in coarse-pore material, such as, for example, sandstone.

This description gives rise to different requirement profiles for sealing systems for natural cut stones, in each case resulting for the area of use, bathroom or kitchen and floors, in each case for acid-stable rocks, such as granite, gabbro or gneiss, and for acid-labile stones, such as, for example, marbles or limestones.

It is known that surfaces of natural cut stones can be impregnated or coated. Impregnation does not close the pores, or at least not completely, and thus permits dirt particles or colorants which are mobilized in liquids to continue to enter the pores and the interior regions of the stone. For example, with a sufficiently long residence time on the surface of a stone which was impregnated, for example, with Protectosil® Antigraffiti, red wine penetrates into the pores. Thus, evaporation of the total liquid of a drop of red wine on the surface of an impregnated light stone results in the formation of a spot which has a red or brownish appearance and cannot be removed without damaging the surface or by the use of strong oxidizing agents.

Coating of the surface permits closing of the pores but changes the handle behavior and the mechanical and chemical properties of the kitchen worktops. Hot articles, such as, for example, pots or pans, can cause damage, such as, for example, ugly discolorations or harm to the paint surface.

According to the Building Information Natural Cut Stone 3.2 of the Deutsches Naturwerkstein-Verbandes e.V., there are various cleaning agents and care agents for natural cut stones. Of particular interest are the impregnating agents, to quote:

"Impregnation: Impregnations must not form any layer on the rock surface. The generally silicone- or siloxane-containing agents should not produce any surface changes and should not leave behind any gloss. These agents have as a rule good durability since they are not exposed to any mechanical wear. The rock must remain open-pore and the water vapor permeability must not be substantially impaired. Impregnations can be used inside and outside. The care of the treated surfaces is facilitated by water- and possibly also oil-repellent effect".

In the same brochure, it is stated under seals, to quote:

"Seals are always layer-forming coats. They produce a deepening of color and a gloss effect. In the floor region, seals have only medium to short durability since they are removed by stresses. Since seals close the pores of the rocks, water vapor diffusion is impeded. This can lead to damage to the natural stone. Seals are generally used only on the inside. The layer formed by the agent protects the stone and facilitates care. Seals can greatly reduce the nonslip properties of floor coverings".

The disadvantage of the known systems for the treatment of natural cut stones is that these systems either completely close the pores and hence prevent breathing activity, i.e. the passage of water vapor (paint or seal systems) or the pores remain completely open so that penetration of liquid cannot be completely prevented (impregnation systems).

It was therefore an object of the present invention to provide a system for sealing natural cut stones which treats the pores of natural cut stones so that penetration of liquids in particular of water-containing liquids, is as far as possible completely prevented and that passage of water vapor through the stone is still possible.

Surprisingly, it was found that the pores of natural cut stones which are treated with a composition which is obtained by a sol-gel process can be closed to such an extent that water vapor can pass through the natural cut stone but water-based liquids cannot enter the pores of the natural cut stone.

The present invention therefore relates to sealed natural cut stones based on pore-containing natural cut stones, which is characterized in that at least the pores of the natural cut stones which are accessible from a surface of the natural cut stones are filled with a matrix material which has a network formed at least partly by silicon-oxygen bonds, the silicon atoms present in the network having organic radicals bonded at least partly via carbon atoms to the silicon.

The present invention likewise relates to a method for sealing a natural cut stone, which is characterized in that, for sealing the natural cut stone, a flowable, fluid composition which is introduced into the pores accessible from the surface and solidified there is prepared, this composition being prepared by first preparing a mixture of a silane of the formula $(Z^1)_1Si(OR)_3$, where $Z^1$=OR or Gly (=3-glycidyloxypropyl) and R=an alkyl radical having 6 to 6 carbon atoms, an alcohol and a water-containing initiator, selected from an aqueous acid or base, and mixing this mixture with a second silane of the formula $(Z^2)_zSi(OR)_{4-z}$, where R=an alkyl radical having 1 to 6 carbon atoms, where $Z^2=H_aF_bC_n$ where a and b=integers, a+b=1+2n, z=1 or 2, n=1 to 16 or, where $Z^1$=Gly, $Z^2$=Am (=3-aminopropyl) and z=1 or 2, z being 1 when $Z^2$ is Am.

The present invention also relates to the use of a natural cut stone according to the invention in the erection of buildings, walls, roofs, floors, sanitary facilities, kitchens or paths, and a natural stone or natural cut stone seal according to the invention, natural stone seal, which is characterized in that the seal has a matrix material which has a network formed by silicon-oxygen bonds, and the silicon atoms present in the network have organic radicals bonded partly via carbon atoms to the silicon. Further developments are given in the following descriptions of sealed natural cut stones according to the invention which have been treated with the natural stone seals according to the invention.

The advantage of the seal according to the invention is that, in comparison with the known seals, the seal need not be layer-forming so that mainly the pores, but not those parts of the surface of the natural cut stone which are present between the pores, are treated with the sealing matrix. In this way, it is ensured in particular that the surface properties of the natural cut stone, such as, for example, acid resistance or color, remain virtually unchanged. Nevertheless, the pores can be closed to such an extent that penetration of water-containing liquids is very substantially prevented. If the seal is layer-forming, additional properties, such as, for example, an increase in the acid stability in the case of carbonatic minerals, particularly in the case of marbles or limestones, can be achieved.

The seals according to the invention for natural engineering materials utilize various aspects of predominantly inorganic sol-gel systems. Particularly the mechanical strengths of the natural cut stones are not changed or only insignificantly changed by the seal according to the invention. This arises from the peculiarity of not being able to form any noticeable layer but chiefly penetrating into the pores and providing a seal there.

If it is desired also to form layers of the sealing matrix on the surface between the pores, this too can be achieved. Owing to the high crosslinking density of such systems, due to the formation of —O—Si—O—networks, chemical attacks on surfaces equipped with such layers, for example by household cleaners or by agents customary in the household such as vinegar or mustard, can be virtually completely ruled out.

Compared with organic paint coats used in the prior art as a sealing matrix, the seal according to the invention has the advantage that no ugly discolorations form even as the result of hot articles which are placed on such surfaces.

The method according to the invention is described by way of example below without there being any intention to limit the invention thereto, the scope of protection of which is evident from the claims and the description. The claims themselves also form part of the disclosure content of the present invention. Where ranges or preferred ranges are stated in the following text all theoretically possible partial ranges lying in these ranges are also intended to be part of the disclosure content of the present invention without these having been explicitly mentioned, for reasons of greater clarity.

The sealed natural cut stone according to the invention, based on a pore-containing natural cut stone, is distinguished in that at least the pores of the natural cut stone which are accessible from a surface of the natural cut stone are filled with a matrix material which has a network formed at least partly by silicon-oxygen bonds, the silicon atoms present in the network having organic radicals bonded at least partly via carbon atoms to the silicon. The organic radicals may have or be alkyl and/or fluoroalkyl radicals having a number of carbon atoms of 1 to 20. Particularly preferably, the organic radicals present may be methyl, octyl, hexadecyl and/or tetrahydrotridecylfluorooctyl radicals. Heteroorganic radicals which form silicon-heteroorganic radical-silicon bonds may be present as organic radicals in the matrix material of the sealed natural cut stone according to the invention, instead of or in addition to said alkyl and/or fluoroalkyl radicals having a number of carbon atoms of 1 to 20. The heteroorganic radical preferably has at least one nitrogen atom as the heteroatom. Preferably, the network has, as heteroorganic radicals, those which are obtained by condensation of an amino group with a glycidyloxy group, particularly preferably a 3-aminopropyl group with a 3-glycidyloxypropyl group.

Preferably, the degree of filling, preferably the mean degree of filling, of the pores of the natural stone with the matrix material is from 25 to 100%, preferably 50 to 98% and particularly preferably 60 to 80%, the degree of filling indicating the proportion of the pores of the natural stone whose volume is filled by the oxide particles. The degree of filling of an individual pore can be determined approximately optically by preparing a ground section of a pore accessible from the surface and determining that area of the cross section of the pore which is occupied by the matrix material. A mean degree of filling can generally be estimated from the degree of filling of a plurality of pores.

Pores are understood as meaning any openings, gaps, etc. accessible from the surface. The surface may be both the total surface of a natural cut stone or only the surface of one or more sides of the natural cut stone.

The matrix material may be present exclusively in the pores of the natural cut stone or on the surface between the pores. If the matrix material is present on the surface of the natural cut stone between the pores, it preferably has a thickness of 0.01 to 8 µm, preferably from 0.05 to 5 µm, particularly preferably from 0.1 to 2 µm and very particularly preferably from 0.2 to 1 µm. Surfaces sealed in this manner appear as if they were wet. This means that structures are emphasized with surfaces which simultaneously appear darker. The overall impression of the surface is more lively. If the thickness falls below a certain minimum thickness of 0.01 µm, preferably 0.1 µm, the mechanical protective effect and stability of the sealing matrix decreases substantially.

Oxide particles, in particular oxide particles at least of one of the elements Ti, Si, Zr, Al, Y, Sn or Ce, may be present in the matrix material. In particular, oxide particles, especially hydrophobic oxide particles having a mean particle size of 10 to 1000 nm, preferably of 20 to 500 nm, preferably of 30 to 250 nm, and/or hydrophilic oxide particles having a mean particle size of 0.05 to 30 µm, preferably 1 to 20 µm and preferably of 5 to 10 µm may be present in the matrix material. The hydrophilic particles are preferably present in the matrix material only in the pores. The hydrophobic particles may be present in the matrix material both in the pores and outside the pores, preferred hydrophobic particles which are present in the matrix material outside the pores having a mean particle size of 10 to 250 nm, since this makes it possible to ensure that the sealing matrix is transparent and very substantially colorless and hence the color of the surface of the natural cut stone is not changed or changed only to a very small extent by the sealing matrix. The mean particle size is based on the size of the primary particles or, if the oxides are present as agglomerates, on the size of the agglomerates. The particle size is determined by light scattering methods, for example using a particle size analyzer of the Horiba LB550® type from Retsch Technology.

Where oxide particles are present in the matrix material, they are bonded to one another, to the natural stone and/or to the matrix material by oxygen bridges and/or oxygen-silicon-oxygen bridges or by the network present in the matrix material.

The oxide particles present in the matrix material, in particular the hydrophobic particles, have, on their surfaces, organic radicals, preferably organic radicals bonded to silicon atoms and selected from radicals of the formula $X_{1+2n}C_n$—, where n=1 to 20 and X=hydrogen or fluorine, it being possible for X in a radical according to the formula to denote exclusively fluorine, exclusively hydrogen or both fluorine and hydrogen. Hydrophobic oxide particles preferably have alkyl radicals, such as, for example, heptyl, octyl, nonyl, decyl, undecyl or dodecyl radicals, or haloalkyl radicals, in particular fluoroalkyl radicals, such as, for example, trifluoromethyl, pentafluoroethyl or tetrahydrotridecafluorooctyl radicals, and trimethylsilyl radicals. Preferred hydrophobic particles are, for example, pyrogenic silicas or precipitated silicas.

The hydrophilic particles present, if desired, in the matrix material are preferably particles of alumina, titanium dioxide or silica, as obtainable, for example, from Degussa AG under the name Aerosil® or Sipernat®.

The presence of oxide particles, in particular hydrophobic oxide particles, is advantageous particularly when the matrix material has, as organic radicals, no heteroorganic radicals which form silicon-heteroorganic-silicon bonds, since, particularly in this case, shrinkage of the matrix material and hence reduced protection of the natural cut stone are very substantially avoided by the presence of the oxide particles. For avoiding or minimizing the shrinkage, however, the presence of oxide particles is preferred even when heteroorganic radicals are present in the matrix material.

The natural cut stone according to the invention may be a natural cut stone selected from granite, gabbro, granodiorite, syenite, larvikite, diorite, gabbro, rhyolite, quartz porphyr, andesite, trachyte, kuselite, porphyr, basalt, lava, melaphyr, diabase, picrite, marble, gneiss, serpentinite, limestone, Jura limestone, shell limestone, travertine, dolomite, onyx, alabaster, sandstone, glauconite sandstone, greywacke, shale and quartzite. The natural cut stone is particularly preferably a granite, a gabbro, a marble or a sandstone. Depending on the field of use, the natural cut stone or the surface thereof may have been mechanically treated. Preferably, the natural cut stone comprises a natural stone which has a polished surface or has a polished surface on at least one, two, three, four, five or more sides. Such natural stones can be particularly advantageously used in the sanitary area and in the kitchen area but also for facade design or for the production of gravestones.

The sealed natural cut stone according to the invention is preferably obtainable by the below-described method according to the invention. This method for sealing a natural cut stone is distinguished in that, for sealing the natural cut stone, a flowable, fluid composition which is introduced into the pores accessible from the surface and solidified there is prepared, this composition being prepared by first preparing a mixture of a silane of the formula $(Z^1)_1Si(OR)_3$ where $Z^1$=OR or Gly (=3-glycidyloxypropyl) and R=identical or different, preferably identical, alkyl radicals having 1 to 6 carbon atoms, an alcohol and a water-containing initiator, selected from an aqueous acid or base, and mixing this mixture with a second silane of the formula $(Z^2)_zSi(OR)_{4-z}$, where R=an alkyl radical having 1 to 6 carbon atoms, where $Z^2$=$H_aF_bC_n$ where a and b=integers, a+b=1+2n, z=1 or 2, n=1 to 16 or, where $Z^1$=Gly, $Z^2$=Am (=3-aminopropyl), z being 1 when $Z^2$ is Am.

In the method according to the invention, the natural cut stones described above may be used as natural stones. The natural cut stone is particularly preferably a granite, a gabbro, a marble or a sandstone. The natural cut stones may have been mechanically treated beforehand, for example may have been polished. The natural cut stones can also be left in the natural state or can be present in the form when they were quarried. Natural (cut) stones whose surface was polished on one or more sides are preferably used, the polished sides or all sides of the natural cut stone preferably being treated by the method according to the invention.

In the preparation of the composition by mixing compounds of the formula $GlySi(OR)_3$ with compounds of the formula $AmSi(OR)_3$, the molar ratio of compounds of the formula $GlySi(OR)_3$ to compounds of the formula $AmSi(OR)_3$ in the mixture can be varied within wide ranges. Preferably the molar ratio is from 5:1 to 1:5, preferably from 1.5:1 to 1:1.5 and particularly preferably 1:1. For the preparation of such a composition, 3-aminopropyltriethoxysilane (AMEO) and 3-glycidyloxypropyltriethoxysilane (GLYEO) or 3-aminopropyltrimethoxysilane (AMMO) and 3-glycidyloxypropyltrimethoxysilane (GLYMO) are preferably used.

Instead of or in addition to the preparation by mixing of compounds of the formula $GlySi(OR)_3$ with compounds of the formula $AmSi(OR)_3$, the preparation of the composition can be effected by mixing of compounds of the formula $(Z^1)_1Si(OR)_3$ where $Z^1$=OR with compounds of the formula $(Z^2)_zSi(OR)_{4-z}$, where R=identical or different, preferably identical, alkyl radicals having 1 to 6 carbon atoms, where $Z^2$=$H_aF_bC_n$ with a and b=integers, a+b=1+2n, z=1 or 2 and n=1 to 16. The molar ratio of compounds of the formula $(Z^1)_1Si(OR)_3$ to compounds of the formula $(Z^2)_zSi(OR)_{4-z}$ in the mixture can be varied within wide ranges. Preferably, the molar ratio is from 5:1 to 1:5, preferably from 1.5:1 to 1:1.5 and particularly preferably 1:1. For the preparation of such a composition, tetraethoxysilane and methyltriethoxysilane, octyltriethoxysilane, hexadecyltrimethoxysilane and/or 3,3,4,4,5,5,6,6,7,7,8,8-trideca-fluorooctyltriethoxysilane or mixtures thereof are preferably used.

The amount of alcohol to be added to the mixture is dependent on the desired viscosity of the composition and can be varied within wide ranges. Preferably, the proportion of alcohol in the composition is from 30 to 75% by weight. For longer action times, it may be advantageous to add further inert components having a higher boiling point, for example ethylene glycol diethyl ether or diethylene glycol diethyl ether, in concentrations up to 20% by weight, preferably up to 10% by weight.

The solidification of the composition can be effected by drying at room temperature or elevated temperature. Preferably, the solidification is effected by drying at elevated temperature because the solidification times can be substantially reduced thereby. Particularly preferably, the solidification is effected by heating the natural cut stone treated with the composition to a temperature of 50 to 250° C., preferably of 75 to 220° C. and particularly preferably of 100 to 150° C. The duration of heating is dependent on the solidification temperature used and may be 5 minutes to 10 hours. Preferably, the solidification of the composition is effected at a temperature of 75 to 220° C. in the course of 5 minutes to 60 minutes, preferably at a temperature of 100 to 150° C., preferably 110 to 130° C., in the course of 5 to 20 minutes, preferably 10 to 15 minutes.

The method according to the invention is based on sol-gel technology. The particle growth and the formation of a network are pH- and temperature-dependent and influence the network density. At pH values of <7, predominantly network-like structures form. Such conditions are more suitable, for example, for applications on rocks which withstand acid-catalyzed systems. At pH values of at least 7, particle-like structures which have less crosslinking grow as a function of time and of pH. Such conditions are more suitable, for example, for natural cut stones which are acid-sensitive, such as marble. Further details on the influence of the pH on particle formation can be obtained, for example, from R. Iler, "The chemistry of Silica", Wiley, New York 1979. By variation of the initiator, i.e. by using aqueous acid or base, it is therefore possible to promote the formation of a network or the formation of particles. In addition, salts can promote particle aggregation at a pH of 7 to 10.

Intermediate forms of larger particles which form as nets are achievable by changing the pH, by controlling the viscosity and by changing the water concentration but also by the admixing of particles on whose surfaces network formation is catalyzed.

As already said, an acid, preferably a mineral acid, or a base, preferably an inorganic base, can be used as an initiator. If an acid is used as an initiator, it is preferable to use acid in an amount such that the sol obtained has a theoretical pH of 2 to 6. If a base is used as an initiator, it is preferable to use base in an amount such that the sol obtained has a theoretical pH of 8 to 11. The addition of the aqueous base or acid is preferably effected so that the molar ratio of water to compounds according to the formula $(Z^1)_1Si(OR)_3$, in particular $GlySi(OR)_3$, in the preparation of the first mixture is from 100 000:1 to 10:1, preferably from 1000:1 to 100:1.

The composition which is applied to the surface of the natural stone preferably has a content of >50% by weight of liquid components, in particular ethanol or isopropanol. The viscosity can be adjusted by means of the content of liquid components so that the composition can fill the pores of the natural stone and can displace the air present in the pores. If compositions which have a substantially lower proportion of liquid components are used, the pores are not completely filled after the solidification of the sol present in the composition. The rapid increase in viscosity as a result of volatilization of the alcohols can also adversely affect the degree of filling of the pores. By addition of up to 20% by weight, preferably up to 10% by weight, of higher-boiling inert components, for example ethylene glycol ether or diethylene glycol ether, the degree of filling can be positively influenced.

In addition to alcohol, further components can be admixed in the preparation of the composition. Thus, in the preparation of the composition, in particular in the preparation of the composition by mixing of compounds of the formula $GlySi(OR)_3$ with compounds of the formula $AmSi(OR)_3$, in particular tetraethoxysilane and/or a silane of the formula $(H_aF_bC_n)_zSi(OR)_{4-z}$ where a and b=integers, a+b=1+2n, z=1 or 2, n=1 to 15, preferably 2 to 8, and R=identical or different, preferably identical, unsubstituted alkyl radical having 1 to 6 carbon atoms, preferably 1 or 2, preferably 2, carbon atoms can be admixed.

It may be advantageous if, in the preparation of the first mixture, oxide particles selected from the oxides of Ti, Si, Zr, Al, Y, Sn or Ce are suspended in this first mixture. Oxide particles, preferably hydrophobic oxide particles, having a mean particle size of 10 to 1000 nm, preferably of 20 to 500 nm, preferably of 30 to 250 nm are preferably suspended. If the sealing matrix produced from the composition is to be transparent and/or colorless, preferably only oxide particles which have a mean particle size of 10 to 250 nm are suspended. The mean particle size is based on the size of the primary particles or, if the oxides are present as agglomerates, on the size of the agglomerates. The particle size is determined by light scattering methods, for example by an apparatus of the type Horiba LB550® from Retsch Technology. If hydrophobic oxide particles are suspended, they have, on their surfaces, organic radicals bonded to silicon atoms and selected from radicals of the formula $X_{1+2n}C_n-$, where n=1 to 20 and X=hydrogen or fluorine, it being possible for X in a radical according to formula (I) to denote exclusively fluorine, exclusively hydrogen or both fluorine and hydrogen. Preferred radicals are trifluoromethyl or tetrahydrotridecafluorooctane radicals.

The application of the composition according to the invention can be effected by various generally known methods. Thus, the composition can be applied, for example, by means of a doctor blade, a brush or a roller, by spraying on or by immersing the natural cut stone in the composition. Depending on whether the sealing matrix is to be present exclusively within the pores of the natural cut stone or on the surfaces between the pores, preferably in a certain thickness, the composition must be at least partly removed again from the surface between the pores.

For avoiding layers on the surface of the natural stone which are formed by the composition and which may change the surface properties of the natural stone both mechanically/chemically and optically, it may be advantageous if after application of the composition and before solidification of the composition in the pores, a method step is effected in which the composition which is not present in the pores of the natural stone or has not penetrated into the pores of the natural stone is removed from the surface of the natural stone. A method step in which parts of the composition which are not present in the pores of the natural cut stone are at least partly removed from the surface of the natural cut stone is therefore preferably effected after application of the composition, and before solidification of the composition in the pores. The removal of excess composition can be effected, for example, by compressed air, for example by means of an air knife. Excess sol can easily be wiped off polished natural stone surfaces, for example using a rubber wiper.

If a layer of the sealing material is to be present as a protective layer on the surface between the pores, the application of the composition can be effected so that, after solidification of the composition, a sealing layer having a thickness of 0.01 to 8 µm preferably of 0.05 to 5 µm, particularly preferably of 0.1 to 2 µm and very particularly preferably of 0.5 to 1 μm is present between the pores on the surface of the natural cut stone. The thickness of the layer can be controlled, for example, by adjusting the amount of composition applied per square meter or by the use of doctor blades with limitation of the coat thickness. It is also possible to influence the thickness of the sealing matrix between the pores on the surface by partial removal of the applied composition. Thus, by varying the pressure of the compressed air used or by using wipers equipped with suitable spacers, it is possible to ensure that only a part of the applied composition is removed again from the surface of the natural cut stone.

In the case of open-pore natural stone which has a water absorption of more than 1% by weight (determined gravimetrically) on storage in water for 4 hours at 25° C., it may be advantageous if a primer is first introduced into the pores of the natural cut stone and dried or solidified there. For the preparation of the primer, a suspension of hydrophilic oxide particles which preferably have a mean particle size of 0.3 to 30 μm, preferably of 1 to 20 μm and particularly preferably of 5 to 10 μm in a liquid is produced. Hydrophilic oxide particles, such as, for example, alumina, aerosils or precipitated silicas, are preferably used as particles to be suspended. Particularly preferably used particles have a BET surface area of 1 to 100, preferably of 2 to 60 (determined according to BET absorption (DIN 66131)). The proportion of the suspended oxide particles, based on the suspension, is preferably 1 to 50% by weight, preferably 2 to 25% by weight.

In the simplest case, the liquid used for the production of the suspension may be water However, a sol which may be a commercial sol or may be produced by hydrolysis of a hydrolysable compound with an aqueous acid is preferably used as liquid for the preparation of the suspension.

The sol is preferably prepared by hydrolysis of at least one compound of one of the elements Ti, Si, Zr, Al, Y, Sn or Ce, selected from the alcoholates, nitrates, carbonates, acetylacetonates or halides, with an aqueous acid. The preparation of suitable sols is described, for example, in WO 99/155262. The preparation of the sol is particularly preferably effected by hydrolysis of tetraethoxysilane with 0.001 to 10% by weight of a 0.01 N to 15 N acid, preferably 0.1 N to 2 N acid, in particular nitric acid. For adjusting the viscosity of the primer, an alcohol, particularly ethanol, may be added to said primer. The content of added alcohol in the primer to be applied is preferably 1 to 50% by weight. The suspending of the oxide particles in the sol can be effected by thorough mixing. An additional treatment with ultrasound has proved to be particularly advantageous since aggregates which may adversely affect the uniformity of the size of the suspended particles can be broken up thereby.

The introduction of the primer into the pores can be effected by application by means of conventional methods, such as, for example, spraying on, application with a doctor blade or immersion, a subsequent aftertreatment by means of which the primer which still has not solidified can be removed again from the surface of the natural cut stone between the pores preferably being effectable. The aftertreatment may be, for example, wiping off, for example with a rubber wiper, washing off or blowing off, for example using an air knife. This aftertreatment ensures that the primer, which, owing to the particle sizes used, is not completely transparent and/or colorless, does not influence the color of the actual surface of the natural cut stone but changes exclusively the color/transparency of the pores.

The solidification of the primer can be effected according to the solidification of the composition, and it may be advantageous to prolong the heat treatment times substantially, for example by a factor of two to ten.

After solidification, the composition described above gives a natural stone seal according to the invention which is distinguished in that the seal has a matrix material which has a network which is formed by silicon-oxygen bonds and by silicon-heteroorganic radical-silicon bonds and in which oxide particles may optionally be bound or present. Further details on the natural stone seal according to the invention appear in the description of the sealing matrix or the matrix material.

It may be advantageous if the method according to the invention is carried out in such a way that, after solidification of the composition, a further composition having an identical or different composition, preferably a composition identical to that in the first treatment, is applied and solidified at least once more, preferably once to three times. As a result of this application and solidification of the composition twice or more, preferably three or four times, substantially better filling of the pores can be achieved since unfilled partial regions in the filled pores, which form through shrinkage on solidification of the sol, can be filled in the subsequent treatments. In this way, a higher tightness of the coating and hence better protection of the natural cut stones from attacks, for example by acids, is achieved.

The natural cut stones according to the invention or the natural cut stones produced according to the invention can be used, for example, for the erection or production of buildings, walls, roofs, floors, sanitary facilities, kitchens or paths. The natural cut stones are preferably used as shingles, masonry block, facade brick, floor slab, flagstone, worktop, washbasin, sideboards, splash guards or bath surrounds.

The present invention is explained in more detail by the following examples without there being any intention to limit the scope of protection, which is evident from the claims and the description, by the examples.

EXAMPLE 1

Production of a Natural Cut Stone According to the Invention 336 parts by weight of 3-glycidyloxypropyltriethoxysilane (GLYEO), obtainable from Degussa AG under the name DYNASYLAN® GLYEO, were initially introduced into a beaker and mixed with 30 parts of 1% strength by weight aqueous nitric acid. Stirring was effected until the initial 2 phases became one clear, homogeneous phase. 488 parts of a dispersion of 15% by weight Aerosil® R 821 S (silica from Degussa AG) in ethanol were then added. 285 parts of 3-aminopropyltriethoxysilane (AMEO), obtainable from Degussa AG under the name DYNASYLAN® AMEO, were added dropwise to this mixture with stirring, the temperature being kept below 40° C. by external cooling with ice.

The composition thus obtained was applied to a polished granite slab by means of a brush. Projecting composition was scraped off after 20 minutes with a rubber wiper. The granite slab thus treated was treated for 10 minutes in a drying oven at 120° C. for solidification of the composition.

EXAMPLE 2

Coating Experiments

Experiment 1

30 g of a 1% strength by weight aqueous $HNO_3$ were stirred into 336 g of GLYEO. 114 g of a 24% strength by weight ethanolic dispersion of Aerosil® R 8200, a pyrogenic silica from Degussa AG, were mixed in. 285 g of AMEO were then added dropwise with constant stirring, said addition being effected so that the temperature of the mixture did not exceed 40° C. After preparation of the mixture was complete, the sol-gel obtained was stored in a refrigerator.

Experiment 2:

9.5 g of tetraethoxysilane (TEOS) were initially introduced and 0.5 g of DYNASYLAN® 9116 (hexadecyltrimethoxysilane) from Degussa AG were added with stirring. 1 g of diethylene glycol diethyl ether and 4.54 g of a 24% strength by weight dispersion of Aerosil® R 8200 in ethanol were then mixed in. As a final component, 0.15 g of a 1% strength by weight ethanolic nitric acid (prepared from concentrated nitric acid and ethanol) was mixed in.

Experiment 3:

This experiment was carried out analogously to Experiment 2. Instead of DYNASYLAN® 9116, DYNASYLAN® F8261 (3,3,4,4,5,5,6,6,7,7,8,8,8-tridecafluorooctyltriethoxysilane) from Degussa AG was used.

Experiment 4:

This experiment was carried out analogously to Experiment 2. Instead of DYNASYLAN® 9116, DYNASYLAN® OCTEO (octyltriethoxysilane) from Degussa AG was used.

Application:

The coating materials from Experiments 1 to 4 were applied in each case by means of a brush to the natural stone surface to be sealed. The natural stones had been rubbed beforehand with a non-fluffing dry cloth. The rock temperature was room temperature. Coating material which had not yet penetrated into the rock was removed by wiping off after 3 minutes. Only in this way is it possible to keep the coating extremely thin and subsequently to differentiate the quality of the coating in the analysis. Because of the different pore structures of the rocks, no application amounts were determined.

Curing:

The curing was effected thermally. The mixture from Experiment 1 was cured for 30 minutes at 120° C. and the mixtures from the other experiments were cured for 30 minutes at 250° C.

Analysis:

Resistance to staining substances was investigated according to DIN ISO 10545-14. On this rating scale, the higher the rating the better is the subsequent cleanability. The chemical resistance was determined with respect to 10% strength by weight aqueous citric acid. For this purpose, a drop was applied to the sealed surface and the time (in seconds) until onset of a reaction (evolution of gas bubbles) was measured. Results of the test for sandstone are shown in Table 1 and those for marble are shown in Table 2.

A green staining substance which comprised 40% by mass of $Cr_2O_3$ in tricaprylin was used as a test paste.

1. hot water, 2. a 1% strength by weight solution of Pril® (from Henkel KGaA) in water, 3. scouring milk of the ATA® brand (from Henkel KGaA) and 4.3% strength by weight aqueous HCl solution were used as cleaning agents. In the 2 minute treatment with the scouring milk, a small drill with a clamped brush head and a rotational speed of 500 revolutions per minute was used.

TABLE 1

Sandstone (Bianco Perlino)

| Coating according to | Chemical resistance in seconds | Spot test |
|---|---|---|
| None | 0 | 3 |
| Experiment 1 | 3 | 4 |
| Experiment 2 | 4 | 4 |

TABLE 1-continued

Sandstone (Bianco Perlino)

| Coating according to | Chemical resistance in seconds | Spot test |
|---|---|---|
| Experiment 3 | 5 | 4 |
| Experiment 4 | 4 | 4 |

TABLE 2

Marble (polished)

| Coating according to | Chemical resistance in seconds | Spot test |
|---|---|---|
| None | 0 | 3 |
| Experiment 1 | 5 | 3 |
| Experiment 2 | 5 | 3 |
| Experiment 3 | 5 | 3 |
| Experiment 4 | 5 | 3 |

EXAMPLE 3

Coating Experiments and Comparative Experiments

Experiment 5:

9.5 g of tetraethoxysilane (TEOS) were initially introduced and 0.5 g of DYNASYLAN® OCTEO (octyltriethoxysilane) from Degussa AG was added with stirring. 1 g of diethylene glycol diethyl ether and 4.54 g of a 24% strength by weight dispersion of Aerosil® R 8200 in ethanol were then mixed in. 0.15 g of a 1% strength by weight ethanolic nitric acid (prepared from concentrated nitric acid and ethanol) was mixed in as a final component.

The coating material from Experiment 5 was applied by means of a brush to the natural stone surface (Bianco Carrara marble) to be sealed. The natural stones had been rubbed beforehand with a non-fluffing dry cloth. The rock temperature was room temperature. After 10 minutes, the coating was dried for 30 minutes at 120° C. in a drying oven. The coating material from Experiment 5 was applied again by means of a brush to the cooled first seal. After 10 minutes, the natural cut stone thus treated was dried for 30 minutes at 250° C.

For comparative purposes, commercial natural cut stone seals were used in Experiments 6 and 7. Graffinet® Hydrosecur plus primer from EAG Efinger & Albani GmbH, D-30457 Hanover, was used in Experiment 6 and a special impregnation for granite worktops from SchwanekampGranit®, D-48712 Gescher, was used in Experiment 7, in each case according to the manufacturer's instructions for use. The analysis corresponded to the analysis stated in Example 2.

TABLE 3

Comparative experiments on marble (Bianco Carrara)

| Coating according to | Chemical resistance in seconds | Spot test |
|---|---|---|
| None | 2 | 3 |
| Experiment 5 | 330 | 5 |
| Experiment 6 | 60 | 4 |
| Experiment 7 | 30 | 3 |

It is clearly evident from the results listed in Table 3 that the seal according to the invention has substantially better properties than commercial impregnations or seals both with regard to the chemical resistance and with regard to the cleanability of the marble.

The invention claimed is:

1. A sealed natural cut stone comprising:
a natural cut stone having pores therein; and
a matrix material filled in at least pores of the natural cut stone which are accessible from a surface of the natural cut stone,
wherein the matrix material has a network formed at least partly by silicon-oxygen bonds and comprises oxide particles of at least one element selected from the group consisting of Ti, Si, Zr, Al, Y, Sn and Ce,
the silicon atoms present in the network have organic radicals bonded to the silicon atoms at least partly via carbon atoms,
the oxide particles comprise, on surfaces thereof, the organic radicals bonded to silicon atoms and represented by a formula $X_{1+2n}C_n-$, where n=1 to 20 and X=hydrogen or fluorine, and
X according to the formula denotes exclusively fluorine, exclusively hydrogen or both fluorine and hydrogen.

2. The sealed natural cut stone according to claim 1, wherein the organic radicals comprise at least one of methyl radical, octyl radical, hexadecyl radical, and tetrahydrotridecylfluorooctyl radical.

3. The sealed natural cut stone according to claim 1, wherein the organic radicals comprise heteroorganic radicals which form silicon-heteroorganic radical-silicon bonds.

4. The sealed natural cut stone according to claim 1, wherein the matrix material is present on the surface of the natural cut stone between the pores in a thickness of 0.01 to 8 μm.

5. The sealed natural cut stone according to claim 1, wherein the matrix material comprises at least one of hydrophobic oxide particles having a mean particle size of 10 to 1000 nm and hydrophilic oxide particles having a mean particle size of 0.05 to 30 μm.

6. The sealed natural cut stone according to claim 1, wherein the oxide particles are bonded to one another and to the natural stone by the network of the matrix material.

7. The sealed natural cut stone according to claim 1, wherein the natural cut stone comprises a material selected from the group consisting of granite, gabbro, granodiorite, syenite, larvikite, diorite, gabbro, rhyolite, quartz porphyr, andesite, trachyte, kuselite, porphyr, basalt, lava, melaphyr, diabase, picrite, marble, gneiss, serpentinite, limestone, Jura limestone, shell limestone, travertine, dolomite, onyx, alabaster, sandstone, glauconite sandstone, greywacke, shale and quartzite.

8. The sealed natural cut stone according to claim 1, wherein the natural cut stone has a polished surface.

9. A sealed natural cut stone comprising:
a natural cut stone having pores therein; and
a matrix material filled in at least pores of the natural cut stone which are accessible from a surface of the natural cut stone,
wherein the matrix material has a network formed at least partly by silicon-oxygen bonds, and the silicon atoms present in the network have organic radicals bonded to the silicon atoms at least partly via carbon atoms,
wherein the natural cut stone is obtained by a method comprising:
preparing a mixture of an alcohol, an initiator comprising one of an aqueous acid and an aqueous base, and a silane of a formula $(Z^1)_1Si(OR)_3$, where $Z^1$=OR or 3-glycidyloxypropyl, and R=identical or different alkyl radicals having 1 to 6 carbon atoms;
mixing the mixture with a second silane of a formula $(Z^2)_zSi(OR)_{4-z}$ to prepare a flowable fluid composition, where R=an alkyl radical having 1 to 6 carbon atoms, and $Z^2$=$H_aF_bC_n$ where a and b=integers, a+b=1+2n, z=1 or 2, and n=1 to 16, or where $Z^1$=3-glycidyloxypropyl, $Z^2$=3-aminopropyl, and z=1 when $Z^2$ is 3-aminopropyl;
introducing said flowable fluid composition into the pores accessible from a surface of a natural cut stone; and
solidifying the flowable fluid composition in the pores.

10. The sealed natural cut stone according to claim 1, wherein the matrix material comprises hydrophobic oxide particles having a mean particle size of 30 to 250 nm.

* * * * *